United States Patent
Miller et al.

(10) Patent No.: US 10,699,351 B1
(45) Date of Patent: Jun. 30, 2020

(54) PROACTIVE INVESTIGATION SYSTEMS AND METHODS FOR CONTROLLED-ENVIRONMENT FACILITIES

(71) Applicant: Securus Technologies, Inc., Carrollton, TX (US)

(72) Inventors: Jeffrey J. Miller, The Colony, TX (US); Kelly Solid, Palm Bay, FL (US); Bryan Stoddart, Palm Bay, FL (US)

(73) Assignee: Securus Technologies, Inc., Carrollton, TX (US)

( * ) Notice: Subject to any disclaimer, the term of this patent is extended or adjusted under 35 U.S.C. 154(b) by 314 days.

(21) Appl. No.: 15/599,039

(22) Filed: May 18, 2017

Related U.S. Application Data (60) Provisional application No. 62/338,269, filed on May 18, 2016.

(51) Int. Cl.
*G06Q 10/10* (2012.01)
*G06Q 10/08* (2012.01)
(Continued)

(52) U.S. Cl.
CPC ....... *G06Q 40/12* (2013.12); *G06F 16/24578* (2019.01); *H04L 67/02* (2013.01);
(Continued)

(58) Field of Classification Search
CPC ............. G06Q 40/12; G06F 16/24578; H04M 3/2281; H04M 3/2218; H04M 3/42221; H04L 67/02
(Continued)

(56) References Cited

U.S. PATENT DOCUMENTS

2002/0138417 A1* 9/2002 Lawrence .............. G06Q 30/02
                                                                 705/38
2004/0024694 A1* 2/2004 Lawrence .............. G06Q 20/10
                                                                 705/38
(Continued)

OTHER PUBLICATIONS

Blinde, Loren, "Securus Technologies adds advanced features to its investigative analytics product." Intelligence Community News, Oct. 29, 2014. (Year: 2014).*

(Continued)

*Primary Examiner* — Jonathan P Ouellette
(74) *Attorney, Agent, or Firm* — Fogarty LLP (57) ABSTRACT

Proactive multiple controlled-environment facility investigative data aggregation and analysis systems and methods employ controlled-environment facility communications management systems, each associated with at least one controlled-environment facility, and a centralized investigative data aggregation and analysis system. The communications management systems each capture data related to communications associated with each resident of each facility and provide financial data related to resident accounts. The centralized investigative data aggregation and analysis system receives the captured data and/or financial data and identifies suspicious activity based on voice biometric analysis, communication analysis, location of calls, the financial data, and/or the like. The centralized investigative data aggregation and analysis system then identifies the resident associated with resultant identified suspicious activity, ranks or rates identified suspicious activities based on frequency and number of suspicious activities for a given identified resident, and displays the identified suspicious activities, according to the rank or rate.

28 Claims, 6 Drawing Sheets

(51) Int. Cl.
*G06Q 30/06* (2012.01)
*G06Q 30/02* (2012.01)
*G06Q 10/06* (2012.01)
*G06Q 40/00* (2012.01)
*H04M 3/22* (2006.01)
*H04M 3/42* (2006.01)
*H04L 29/08* (2006.01)
*G06F 16/2457* (2019.01)

(52) U.S. Cl.
CPC ....... *H04M 3/2218* (2013.01); *H04M 3/2281* (2013.01); *H04M 3/42221* (2013.01)

(58) Field of Classification Search
USPC .................................................. 705/1.1–912
See application file for complete search history.

(56) References Cited

U.S. PATENT DOCUMENTS

2005/0251383 A1* 11/2005 Murray ............... G06F 17/2785
704/9
2013/0263227 A1* 10/2013 Gongaware ............. H04L 63/08
726/4
2014/0279767 A1* 9/2014 Torgersrud ............... G06N 5/02
706/14
2016/0078281 A1* 3/2016 Gongaware ............. H04L 63/08
382/118

OTHER PUBLICATIONS

Securus Technologies, Inc., Securus Technologies, Inc. Announces Acquisition of DirectHit Systems, Inc. (THREADS Product), PRNewswire News release (www.prnewswire.com), Jul. 3, 2012. (Year: 2012).*
King County Contract for work and technology implementation between Securus and King County, Department of Executive Services Finance and Business Operations Division, Procurement and Contract Services Section, Feb. 2, 2014 (Signed in Mar. 2014). (Year: 2014).*
Securus Technologies, Public Lender Presentation, 20150415 (Year: 2015).*
Securus Technologies, Knox County RFP, 20160101 (Year: 2016).*
Raher, Stephen, "You've Got Mail: The promise of cyber communication in prisons and the need for regulation. A Prison Policy Report." www.prisonpolicy.org, 20160121. (Year: 2016).*

* cited by examiner

| DISCOVER | ANALYZE | IMPORT | | | | | | | | |
|---|---|---|---|---|---|---|---|---|---|---|

RETURN TO  Suspicious inmates with pin sharing

INMATE
NAME_1

ALL INFORMATION ▼

GENERAL INFORMATION — 515

⚠ *This inmate has # illicit activity. That means that # of their suspicious activity — 510 has been confirmed.*

Primary Name: NAME_1

WORKSPACES (#)
Site: ▭ Main Detention, FL

SUSPICIOUS ACTIVITY — 535

OVERVIEW
SUSPICIOUS ACTIVITY
ILLICIT ACTIVITY
NAMES
SUBSCRIPTIONS
COMMUNICATIONS

⬢ PIN SHARING — 540
*# call was detected where this inmate was on a call before or after another inmate. We recommend listening to these calls to confirm this suspicion.*

ILLICIT ACTIVITY — 530
PIN SHARING: ###

ADDITIONAL INFORMATION
NAMES (#)
Name/Alias:  NAME_1
Name/Alias:  NAME_1

COMMUNICATIONS
Contacts:  👤 NAME_1      ###      Type:   PLATFORM CALLS   ###
          👤 Beach County   ###
          📞 (yyyy)yyy-yyyy  ###
          ### MORE                                            VIEW ALL TYPES

USER_NAME ▼ — 505

FIG. 6

PROACTIVE INVESTIGATION SYSTEMS AND METHODS FOR CONTROLLED-ENVIRONMENT FACILITIES

CROSS-REFERENCE TO RELATED APPLICATION

This application claims benefit of U.S. Provisional Patent Application Ser. No. 62/338,269, entitled Proactive Investigations for Corrections, filed May 18, 2016, which is incorporated herein by reference.

TECHNICAL FIELD

The present disclosure relates generally to controlled-environment facilities, more particularly to investigations relating to controlled-environment facilities, and specifically to proactive investigations for correctional facilities employing an investigative data aggregation and analysis system.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

Controlled-environment facilities typically control and record information related to the various interactions, communications, and/or transactions involving the facilities' residents. For example, in a correctional facility (e.g., a prison or jail), such information may be collected and used for investigative purposes with respect to past, present, and future criminal activities. Accordingly, various exchanges of information, communication, money, goods, etc. may be recorded and stored in one or more electronic databases. Typically, each controlled-environment facility controls its own information database, which is generally not accessible by other facilities.

However, over the past several years, a sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide proactive multiple controlled-environment facility investigative data aggregation and analysis, employing controlled-environment facility communications management systems, each associated with at least one controlled-environment facility, and a centralized investigative data aggregation and analysis system. The communications management systems each capture data related to communications associated with each resident of each facility and provide financial data related to resident accounts. The centralized investigative data aggregation and analysis system receives the captured data and/or financial data and identifies suspicious activity, based on voice biometric analysis of captured data, communication analysis of the captured data, location of calls indicated by the captured data, the financial data, and/or the like. The centralized investigative data aggregation and analysis system also identifies the resident associated with resultantly identified suspicious activity, ranks or rates identified suspicious activities based on frequency and number of suspicious activities for a given identified resident, and displays the identified suspicious activities and/or associated names, according to the rank or rate.

The Present systems and methods may also employ controlled-environment facility managed access systems, each associated with a respective controlled-environment facility. In such implementations, the centralized investigative data aggregation and analysis system may also receive captured data related to wireless communications intercepted by the respective managed access system, from each managed access system, or from each managed access system though a respective controlled-environment facility communications management system.

The centralized investigative data aggregation and analysis system may also link further details about each identified suspicious activity and/or each resident or other individual associated with an identified suspicious activity to display each identified suspicious activity and/or each name of a resident or other individual associated with an identified suspicious activity, such that selection of the displayed activity or name displays the further details.

The centralized investigative data aggregation and analysis system may also display a user-modifiable badge with each identified suspicious activity and/or each name of a resident or other individual associated with an identified suspicious activity. The badge may indicate whether the identified suspicious activity is unconfirmed, illicit or non-illicit.

The identified suspicious activities may include Personal Identification Number (PIN) sharing, controlled-environment facility resident-to resident calling, and/or the like. The centralized investigative data aggregation and analysis system may identify PIN sharing, based, at least in part, on the voice biometric analysis of the captured data. In such implementations, the centralized investigative data aggregation and analysis system may display a voice score, based at least in part on a voice biometric analysis derived percentage probability that a named resident's or other individual's voice was recognized by the centralized investigative data aggregation and analysis system in a call associated with a PIN other than a PIN of the named resident or other individual. The rank or rating may be based, at least in part, upon the voice score. The centralized investigative data aggregation and analysis system may identify resident-to-resident calling from analysis that detects impermissible conference calls between residents. For example, the analysis that detects impermissible conference calls between residents may detect overlap in time in at least two calls to a same outside phone number from the same controlled-environment facility or different controlled-environment facilities. However, the centralized investigative data aggregation and analysis system may employ an exclusion list of outside phone numbers to which resident-to-resident calling is permitted, so as to disregard a resident-to-resident call to an excluded outside number as suspicious activity.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facilities, more particularly to investigations relating to controlled-environment facilities, and specifically to proactive investigations for correctional facilities. In accordance with embodiments of the present systems and methods, proactive multiple controlled-environment facility investigative data aggregation and analysis systems and methods employ controlled-environment facility communications management systems, each associated with at least one controlled-environment facility, and a centralized investigative data aggregation and analysis system. The communications management systems each capture data related to communications associated with each resident of each facility and provide financial data related to resident accounts. The centralized investigative data aggregation and analysis system receives the captured data and/or financial data and identifies suspicious activity, based on voice biometric analysis of captured data, communication analysis of the captured data, location of calls indicated by the captured data, the financial data, and/or the like. The centralized investigative data aggregation and analysis system also identifies the resident associated with resultantly identified suspicious activity, ranks or rates identified suspicious activities based on frequency and number of suspicious activities for a given identified resident, and displays the identified suspicious activities, according to the rank or rate.

As used herein "suspicious activities," or the like, are activities that include inconsistencies, anomalies, or other behaviors or data that may indicate illicit or illegal actions, or at least actions in violation of controlled-environment facility rules, have taken place or may take place in the future, or the like.

Embodiments of the present systems and methods identify suspicious activity in a controlled-environment facility, such as a correctional institution, based on disparate data sources, including, but not limited to, voice biometrics, communication analysis, location of call, financial data, wireless call managed access data, etc. Various embodiments identify suspicious activity and rank/rate based on frequency and number of suspicious activities for a given resident/inmate. Such embodiments may involve auto-creating a list of "suspicious" resident/inmates based on aggregating investigative data from several database sources and rating and ranking level of suspicious activity to provide high value leads, proactively.

A "multiple controlled-environment facility investigative data aggregation and analysis investigative tool" employed in conjunction with the present systems and methods is an investigative tool that aggregates and analyzes data from multiple sources, including, in accordance with some embodiments of the present invention, multiple controlled-environment facilities. This multiple controlled-environment facility investigative data aggregation and analysis investigative tool may take the form of a web-based portal enabling individuals to store and transmit information. Such a system may include forensic tools that analyze communications into and out of controlled-environment facilities to assist law enforcement. Such a multiple controlled-environment facility investigative data aggregation and a data analysis system, such as the THREADS™ system implemented by SECURUS® TECHNOLOGIES, INC., may provide law enforcement with actionable intelligence and focused leads using data collected from various resources, including, in accordance with embodiments of the present systems and methods.

Figure 1:
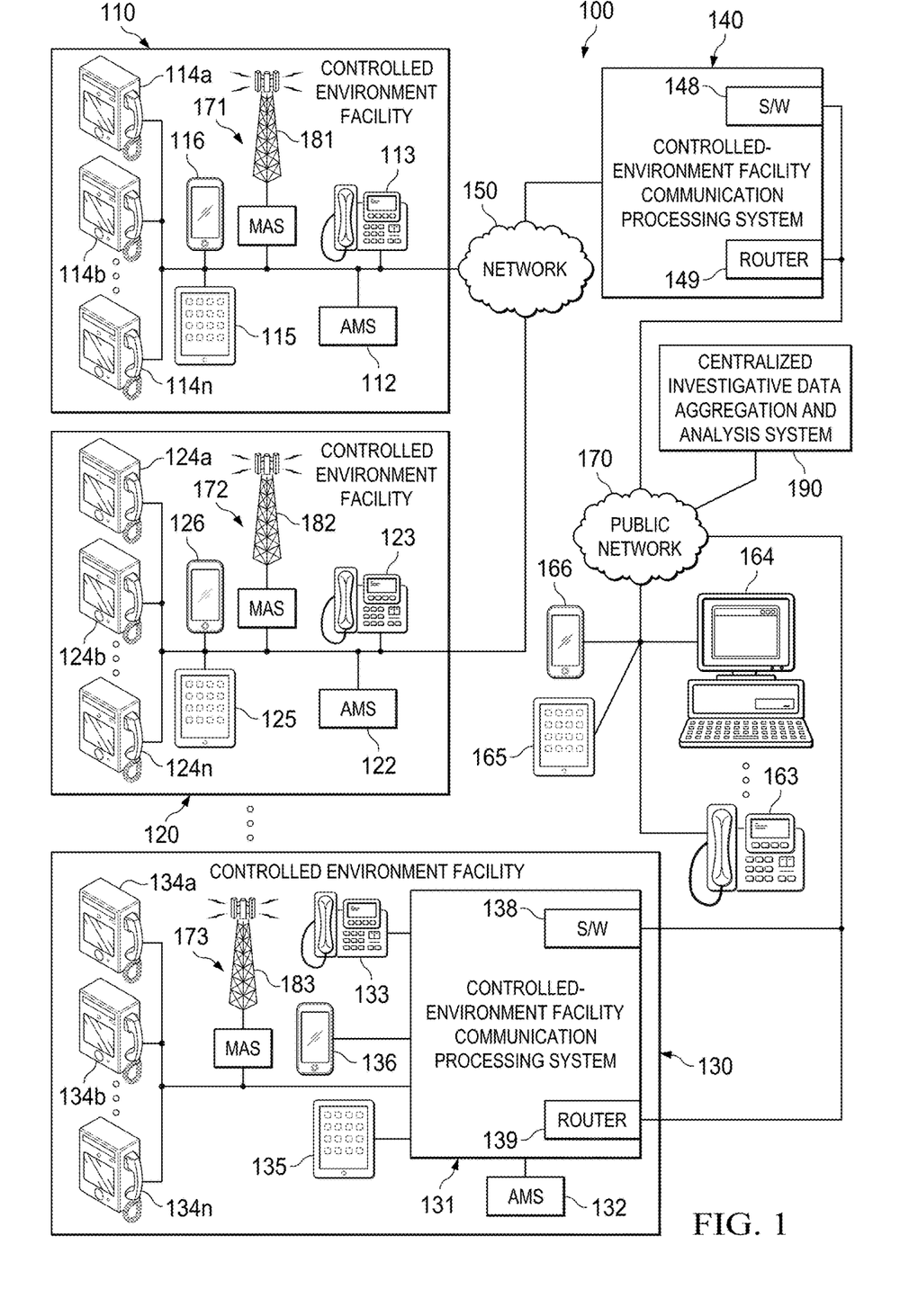
FIG. 1 is a diagrammatic illustration of an example communications environment, wherein an example embodiment of the present systems and methods for proactive correctional facility investigations may be deployed with respect to multiple controlled-environment facilities, according to some embodiments.

FIG. 1 is a diagrammatic illustration of example communications environment 100, wherein an example embodiment of the present systems and methods for proactive correctional facility investigations may be deployed, for example with respect to multiple controlled-environment facilities 110, 120, 130, etc., according to some embodiments of the present systems and methods. Therein, external, centralized communication processing system 140, onsite communication processing system 131, or the like may provide telephone services, videoconferencing, online chat, and other communication services to residents of respective controlled-environment facility 110, 120, 130, etc. As illustrated, in some cases, a communication processing system (131) may be co-located with a controlled-environment facility (130). Alternatively, as also illustrated a communication processing system (140) may be centrally or remotely located, in whole or in part, with respect to one or more controlled-environment facilities (110, 120, etc.), may be connected to such facilities via a public or private network (150) and may provide communication services to such multiple controlled-environment facilities. More generally, however, it should be noted that communication systems 131, 140, etc. may assume a variety of forms, and may be configured to serve a variety of facilities and/or users, whether within or outside of a controlled-environment facility.

In some implementations, wherein the controlled-environment communication system (131) is located within the controlled-environment facility (130), it may have direct access to an Administration Management System (AMS) 132 (or a Jail Management System (JMS) in correctional environment embodiments) for garnering information used in accordance with various embodiments of the present systems and methods. In other embodiments, where the (central) controlled-environment facility communication system (140) is located remotely with respect to the controlled-environment facility (110, 120, etc.), access to AMS (or JMS) 112, 122, etc. may be obtained via a computer network such as, for example, network 150, for gathering information used in accordance with various embodiments of the present systems and methods.

In the context of a correctional facility, the respective JMS or AMS databases may also include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity). Other management systems may include public phone companies, cell phone forensics, internet service providers, visitation systems including video and non-video systems, postal services, email services, payment processors and the like.

In addition to providing certain visitation and communication operations, communication processing systems 131 and 140 may attempt to ensure that an inmate's calls, video conferences, online chats, etc. are performed only with non-residents whose identities, devices, email addresses, phone numbers, etc. are listed in that inmate's Personal Allowed Number (PAN) or Pre-Approved Contact (PAC) list. Each inmate's PAN or PAC list may be stored, for example, in a database maintained by respective AMS (or JMS) 112, 122 or 132, or the like. In addition to PAN or PAC list(s), AMS (or JMS) 112, 122 or 132 (databases), or the like, may also store inmate or resident profile data (RPD), as well as visitation rules applicable to each inmate, Communication Detail Records (CDRs), or similar records, for resident phone calls, video visitations, texts, online chats, or the like.

Residents may use more-or-less conventional telephones 113, 123, 133, or the like to access certain communication services, under control of respective communication processing system 131, 140, etc. Additionally, or alternatively, in some facilities a resident may use a video visitation device 114a through 114n, 124a through 124n, 134a through 134n, or the like, to place voice calls, as well as for video visitation, under control of respective communication processing system 131, 140, etc. Such a video visitation device may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an Intelligent Resident Device (IRD), or the like, and in a correctional institution embodiment, as an Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 131, 140, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, and checking the status of his or her case. The intelligent facility device may include an RFID or biometric reader, or the like to enable precise identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, such an IRD may be "stripped-down," particularly from the standpoint of what applications programs (apps) are provided or allowed on the IRD, and/or connectivity afforded to the IRD. By way of example, such an IRD may employ an operating system kernel that has been rebuilt for use in such a tablet computing device in a controlled-environment facility. For example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IRD provided to inmates of correctional facilities, might include apps that may be of particular use to an inmate, in general, such as access to a legal research service, or of more specific interest, such as providing an inmate nearing release, access to employment searching apps or the like. Hence, such IRDs may be used to help soon to be released inmates transition. For example, the IRD may be used to communicate with a future employer, or the like. As such, IRDs may be sponsored, or otherwise subsidized by organizations or companies, assisting with the transition of inmates into society. As noted, in accordance with embodiments of the present systems and methods, IRDs may be used to communicate with others, such as through phone calls, video calls, or the like. To this end, such IRDs (115, 125, 135, 116, 126, 136, etc.) may include a preinstalled, non-removable app to facilitate implementation of embodiments of the present systems and methods, and/or to carry out certain aspects of embodiments of the present systems and methods.

To access communications services, a resident may initiate telephone services by lifting the receiver on telephone 113, 123, 133, etc. or IFD 114, 124, 134, etc. and/or otherwise initiating a call, such as by launching an applications program (app) on IRD 115, 125, 135, 116, 126, 136, etc. At which time, the resident may be prompted to provide a personal identification number (PIN), other identifying information or biometrics. An interactive voice response (IVR) unit (not shown, but which may be integrated into communications processing system 131 and/or 140, etc.) may generate and play a prompt or other messages to the resident. Under the control of communication processing system 131 and/or 140, etc. the device may be capable of connecting to a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Switch 148, 138, etc. in respective communication processing system 131, 140, etc. may be used to connect calls across a PSTN (i.e. network 170), such as calls from controlled-environment facility telephone 113, 123 or 133 and non-resident telephone 163. Router 149, 139, etc., media gateway functionality, or the like of respective communication system 131, 140, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

In accordance with various embodiments of the present systems and methods, a controlled-environment communication apparatus that may carry out capture communications data may take the form of central and/or onsite controlled-environment facility communication management system 140 and/or 131, respectively. Additionally, or alternatively, as mentioned above, intelligent controlled-environment facility communication devices, such as IFDs 114, 124, 134, etc. and/or residents IRDs 115, 125, 135, 116, 126, 136, etc. may be employed to facilitate implementation of embodiments of the present systems and methods, and/or to carry out certain aspects of embodiments of the present systems and methods, such as capture communications data. Computer-based IFDs 114, 124, 134, etc. may include programming and/or hardware to facilitate implementation of embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Also, in accordance with various embodiments, a controlled-environment facility wireless communications Managed Access System (MAS) associated with each of one or more of the respective controlled-environment facilities may intercept and/or capture data related to illicit wireless communications, such as calls placed and/or received within the respective controlled-environment facility. Such a MAS (171, 172 or 173) may be a permanent system installed in or in conjunction with subject controlled-environment facility 110, 120 or 130, or may be temporary. MAS hardware employs antennas and the like, to continuously monitor communications devices operating in the controlled-environment facility, collecting communications device data, such as IMEI, IMSI, MEID and/or MIN, numbers dialed or texted-to, and/or the like for both communications devices within the respective facility and those outside the facility in contact with communications devices located in the respective facility.

MAS 171, 172 or 173 may generally act as a cell site at/for the respective controlled-environment facility. MAS 171, 172 or 173 may be employed in some controlled-environment facilities to intercept and manage communications attempted by contraband wireless communications devices (e.g. smuggled-in cell phones, etc.). Each MAS may employ a (central) cellular data access point 181, 182 or 183 (i.e. a cellular antenna). For example, dedicated cellular data access point 181, 182 or 183 may be placed within (e.g. in or near a center of controlled-environment facility 110, 120 or 130), or at least near enough to the respective controlled-environment facility, such that all mobile communications devices within the facility, including contraband communications devices, identify cellular data access point 181, 182 or 183 as the primary base station for the communications cell. In certain embodiments, the power levels and/or antenna beam directionality associated with cellular data access point 181, 182 or 183 may be adjusted such that the geographical area of the communications cell corresponds with the area of respective controlled-environment facility 110, 120 or 130. Thus, all cellular communications originating from (and/or terminating) within respective controlled-environment facility 110, 120 or 130 may be directed through MAS 171, 172 or 173 or another embodiment of a communications interception device, such as controlled-environment facility communications processing system 131 or 140, connected thereto.

MAS 171, 172 or 173 may control communication from and to contraband communications devices without impacting legitimate wireless communications (such as by controlled-environment facility staff wireless communications devices, approved communications devices, or the like) or within designated areas of controlled-environment facility 110, 120 or 130. Such a MAS may be a combination of a specially managed cellular telephone system network and a tightly controlled distributed antenna system, central antenna 181, 182 or 183, or the like. MAS 171, 172 or 173 may employ 2G, 3G, 4G and 5G technologies and protocols used by wireless cellphone carriers. MAS 171, 172 or 173 may apply policy rules determined by facility administrators, which may be administered by respective controlled-environment facility AMS 112, 122, 132.

In accordance with embodiments of the present systems and methods a proactive multiple controlled-environment facility investigative data aggregation and analysis system may be web-based. That is, in accordance with embodiments of the present systems and methods a secure, web-based portal enabling individuals to store and transmit information, including forensic tools that analyze communications into and out of controlled-environment facilities assists law enforcement. This portal may include a "dashboard" which displays, among other information, suspicious resident/inmate activity and investigative "widgets." The dashboard may include several components, such as searching, suspicious activity, tasks, indication of top residents/inmates, list of top contacts, listing of recent records, and/or the like. For example, in accordance with embodiments of the present systems and methods a total number of new suspicious activities and a top five (by way of example) inmates that have been flagged with suspicious activity, such as from the previous day (e.g. one day's worth of data) may be displayed in the dashboard. The inmates may be sorted from top to bottom with the most suspicious at the top. In various embodiments, the user can choose the link for the suspicious inmate for further investigation.

To such ends, the present proactive investigation systems and methods may employ the controlled-environment facility communications management systems (131 and 140) associated with at least one controlled-environment facility (110, 120 or 130) and a centralized investigative data aggregation and analysis system (190). Controlled-environment facility communications management systems 131 and 140 may, in accordance with embodiments of the present systems and methods, capture data related to communications associated with each resident of each controlled-environment facility and provide financial data related to controlled-environment facility resident accounts, such as may be maintained by AMS(s) 112, 122, 132, in conjunction with database(s) maintained thereby, or the like. Centralized investigative data aggregation and analysis system 190 may, in accordance with embodiments of the present systems and methods, receives, such as from each controlled-environment facility communications management systems 131 and 140, captured data related to communications associated with each of the plurality of residents and/or financial data related to controlled-environment facility resident accounts.

Centralized investigative data aggregation and analysis system 190 may also receive captured data related to wireless communications intercepted by the respective MAS 171, 172 or 173. This captured data may be received directly from the respective MAS 171, 172 or 173, such as via a communications network, or the captured data may be provided to centralized investigative data aggregation and analysis system 190 though respective controlled-environment facility communications management system 131 or 140.

Centralized investigative data aggregation and analysis system 190 may also identify suspicious activity, based at least in part on voice biometric analysis of the captured data, communication analysis of the captured data, location of calls listed in the captured data, and the financial data. Further, the centralized investigative data aggregation and analysis system may also identify the controlled-environment facility resident associated with identified suspicious activity.

Centralized investigative data aggregation and analysis system 190 also ranks, or otherwise rates identified suspicious activities based on frequency and/or number of suspicious activities for a given resident, or the like and displays at least a predetermined number of the identified suspicious activities, according to the rank, such as via the web-based portal dashboard, or the like. Alternatively, or additionally, centralized investigative data aggregation and analysis system 190 may display names of at least a predetermined number of individuals or residents associated with identified suspicious activities, according to this ranking. In such embodiments, centralized investigative data aggregation and analysis system 190 may only display the identified suspicious activities and the names of individuals or residents associated with identified suspicious activities, according to the rank from a predetermined time period, such as the identified suspicious activities and the names of individuals or residents associated with identified suspicious activities over the immediately preceding day (i.e. the previous twenty-four hours). In accordance with embodiments of the present systems and methods centralized investigative data aggregation and analysis system 190 may also link further details about each identified suspicious activity and/or each individual or resident associated with an identified suspicious activity to display of each identified suspicious activity and/or each name of an individual or resident associated with an identified suspicious activity. Selection of the displayed activity or name may display such further details. These further details may include a CDR, one or more communication recording files, financial data, location, and other types of investigative data captured from the communication, or the like. Additionally, or alternatively, centralized investigative data aggregation and analysis system 190 may display a badge with each identified suspicious activity and/or each name of an individual or resident associated with a displayed suspicious activity. This badge may indicate whether the identified suspicious activity is unconfirmed, illicit, non-illicit, etc. In accordance with various embodiments an authorized user (e.g. a law enforcement officer, controlled-environment facility officer, or the like, with sufficient (predetermined) authority) may be provided a mechanism whereby they can change the indication of the identified suspicious activity as unconfirmed, illicit, non-illicit, etc.

In accordance with some embodiments of the present systems and methods, the suspicious activities may fall into a number of different categories, two example categories may include: resident-to-resident (e.g. inmate-to-inmate calling in correctional facility embodiments) and PIN sharing. For example, A resident may have multiple suspicious activities in either one or both of such categories. These categories of suspicious activities may be designated throughout the dashboard by respective icons.

Figure 2:
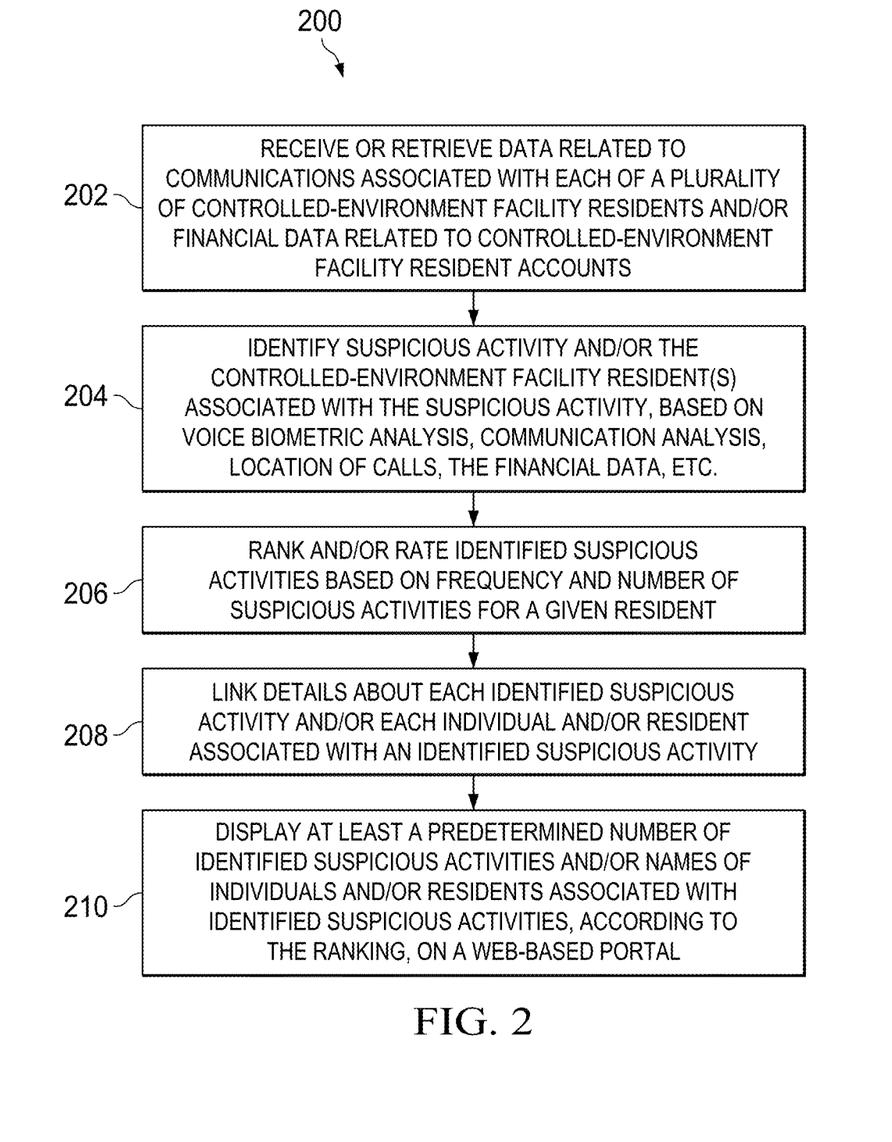
FIG. 2 is a flowchart of an example proactive correctional environment investigation reporting process, in accordance with some embodiments.

FIG. 2 is a flowchart of example proactive correctional environment investigation reporting process 200, in accordance with some embodiments. Therein, a multiple controlled-environment facility investigative data aggregation and analysis system implemented process is shown. At 202, the centralized investigative data aggregation and analysis system (190) receives (or otherwise retrieves (i.e. requests and receives)) captured data from at least one controlled-environment facility communications management system (131 or 140). This data may be related to communications associated with each of the plurality of residents of the respective controlled-environment facility (110, 120 or 130) and/or financial data related to controlled-environment facility resident accounts, such as maintained by respective controlled-environment facility AMSs (112, 122, 132). Additionally, captured data related to wireless communications intercepted by at least one respective MAS may be provided to the centralized investigative data aggregation and analysis system, such as via a respective controlled-environment facility communications management system, or directly.

At 204, the centralized investigative data aggregation and analysis system (190) may identify suspicious activity and the controlled-environment facility resident associated with the resultant identified suspicious activity. This identification may be based, at least in part, on voice biometric analysis of captured data, communication analysis of the captured data, location of calls indicated by the captured data, and/or the financial data.

To identify PIN sharing activities at 204, the centralized investigative data aggregation and analysis system (190) may discern, reveal or otherwise identify PIN sharing activities, based, at least in part, on the voice biometric analysis of the captured data. A voice score may be derived at 204, as well, based at least in part on a voice biometric analysis derived percentage probability that a named individual's or resident's voice was recognized by the centralized investigative data aggregation and analysis system in a call associated with a PIN other than a named individual's or resident's PIN.

To identify resident-to resident (e.g. inmate-to-inmate) calling suspicious activities at 204, the centralized investigative data aggregation and analysis system (190) may reveal or otherwise identify resident-to resident calling from analysis that detects impermissible conference calls between residents. The analysis that detects impermissible conference calls between residents may detect overlap in time, of at least two calls to a same outside phone number from the same or different facilities. However, in accordance with various embodiments the centralized investigative data aggregation and analysis system (190) may employ an exclusion list of outside phone numbers to which resident-to resident calling is permitted so as to disregard a detected resident-to-resident call to an excluded outside number. For example, in accordance with some embodiments of the present systems and methods, an auto-generated blacklist may filter out (exclude) phone numbers that are called by multiple inmates. In accordance with some such embodiments, an investigative data aggregation and analysis system user, customer, facility, or the like, can save a bounce list as a blacklist. These blacklists (auto-generated and customer saved) may be used as exclusions when identifying conference calls (i.e. inmate-to-inmate calls).

The centralized investigative data aggregation and analysis system may rank, rate, or otherwise organize or sort, identified suspicious activities, at 206, based, for example on frequency and number of suspicious activities for a given resident. With respect to PIN sharing and similar activities, the ranking of suspicious activities and/or individuals suspected of suspicious activities at 206 may be based, at least in part, upon the voice score derived at 204.

The centralized investigative data aggregation and analysis system (190) may link details about each identified suspicious activity and/or each individual or resident associated with an identified suspicious activity, at 208. At 210 the centralized investigative data aggregation and analysis system displays at least a predetermined number of the identified suspicious activities and/or names of at least a predetermined number of individuals or residents associated with identified suspicious activities, according to the ranking from 206. This display may be on a centralized investigative data aggregation and analysis system web-based portal dashboard. The displayed suspicious activities and/or names may be those from a predetermined or user-selected time period, such as for the previous twenty-four hours. Since the details about each identified suspicious activity and/or each individual or resident associated with an identified suspicious activity are lined at 206 to suspicious activity and/or name displayed at 208, selection of the displayed activity or name displays the details, which may be a CDR, one or more communication recording files, financial data, location, and other types of investigative data captured from the communication, or the like.

Further with respect to PIN sharing and similar activities, the centralized investigative data aggregation and analysis system dashboard may display a voice score derived at 204. The rank order in which the suspicious activities and/or individuals suspected of suspicious activities is displayed may be based, at least in part, upon such a voice score, whether the voice score is displayed, or not.

Display of suspicious activities, names, or the like on the centralized investigative data aggregation and analysis system web portal dashboard may include display of user modifiable badges. Such user modifiable badges may be displayed with each identified suspicious activity and/or each name displayed at 208. The respective badge may indicate whether the identified suspicious activity is unconfirmed, illicit, non-illicit, etc. and such indication may be modifiable by a user who has the proper authority.

Figure 3:
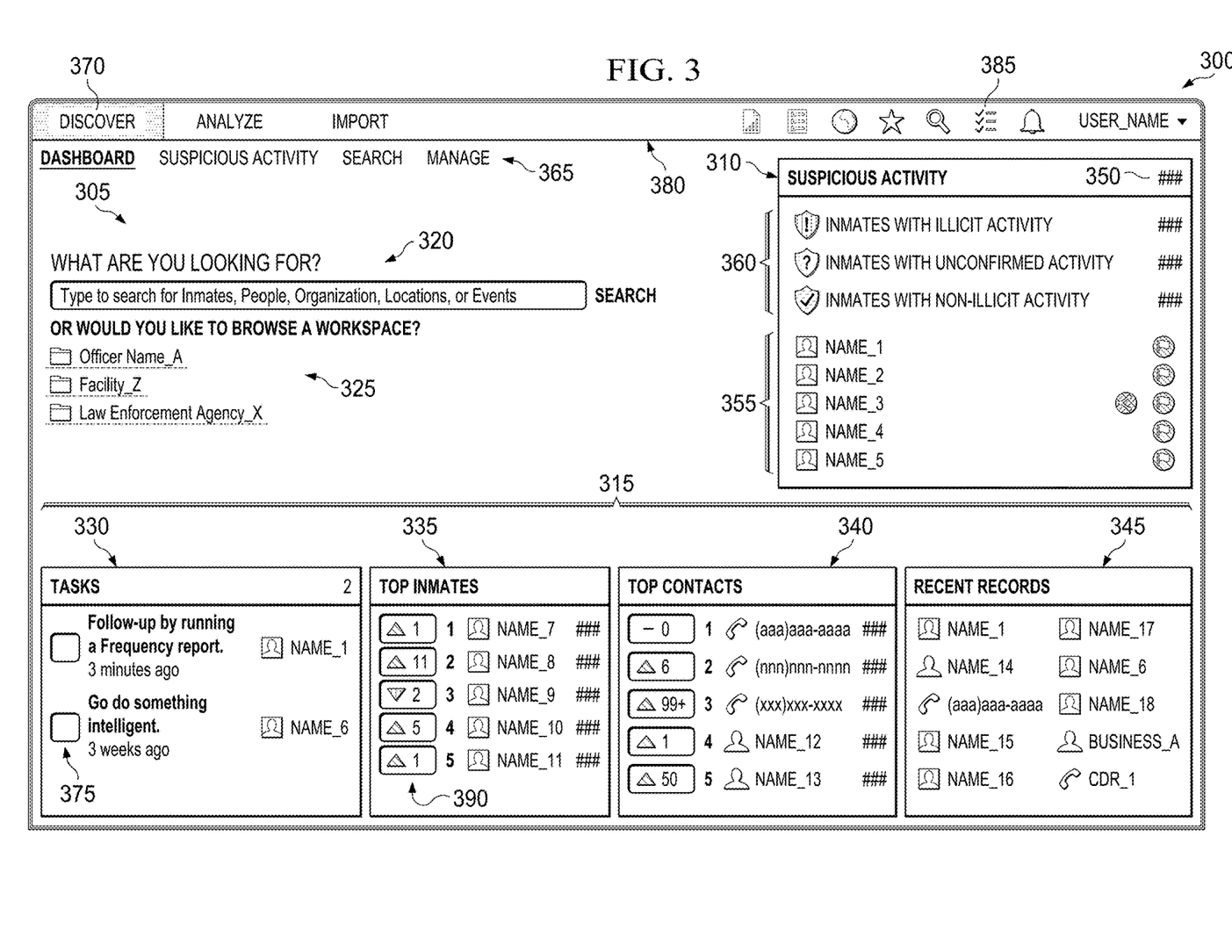
FIG. 3 is an illustration of an example centralized investigative data aggregation and analysis system web portal, showing an example dashboard screen, according to some embodiments.

FIG. 3 shows example centralized investigative data aggregation and analysis system web portal 300 showing an example dashboard screen 305, according to some embodiments. Embodiments of the present systems and methods employ secure, web-based portal 300 to enable individuals, such as law enforcement, controlled-environment facility administrators or officers, or the like, to store and transmit information. Portal 300 may include forensic tools that a centralized investigative data aggregation and analysis system (190) provides for analysis of communications into and out of controlled-environment facilities to assists law enforcement, controlled-environment facility personnel, and/or the like. Illustrated portal 300 is an embodiment adapted for use in a law enforcement employing data from and related to inmates of one or more correctional facilities or the like. Portal 300 may include dashboard 305 which displays, among other information, suspicious resident/inmate activity 310 and investigative "widgets" 315. Dashboard 305 may be a home or "landing" page for an investigator accessing portal 300. As noted above, categories of suspicious activities may be designated throughout the dashboard by respective icons. In accordance with various embodiments, a user can hover over a suspicious activity icon for a specific inmate and a "tool tip" will show the number of suspicious activities in that category for that inmate.

Dashboard 305 may include several components, such as searching dialog 320, navigation pane 325, aforementioned suspicious activity pane 310, and investigative widgets 315, such as tasks widget 330, top inmates widget 335, top contacts widget 340, recent records widget 345, and/or the like, as shown displayed generally at the bottom of dashboard 305, as discussed further below. As illustrated in the example of FIG. 3, in accordance with embodiments of the present systems and methods, a total number of new suspicious activities (350) and a top five inmates (355) that have been flagged with suspicious activity, such as from the previous day (e.g. in the past twenty-four hours of data, or the like) may be displayed in dashboard suspicious activity pane 310. Inmates 355 shown therein may be sorted from top to bottom with the most suspicious at the top. In various embodiments, the user can choose the link for the suspicious inmate for further investigation. In the event that there are no suspicious activities for the prior day, a note (on the dashboard) will alert the investigator of this result, such as in suspicious activity pane 310.

Further, in accordance with various embodiments of the present systems and methods, suspicious activity may have designations with associated badges 360. For example, all suspicious activity may be "unconfirmed" until a user designates it otherwise (e.g. such as, "illicit" or "non-illicit"). This designation may occur in (an)other section(s) of the portal, such as discussed below (e.g. on a "suspicious activity" screen).

Figure 4:
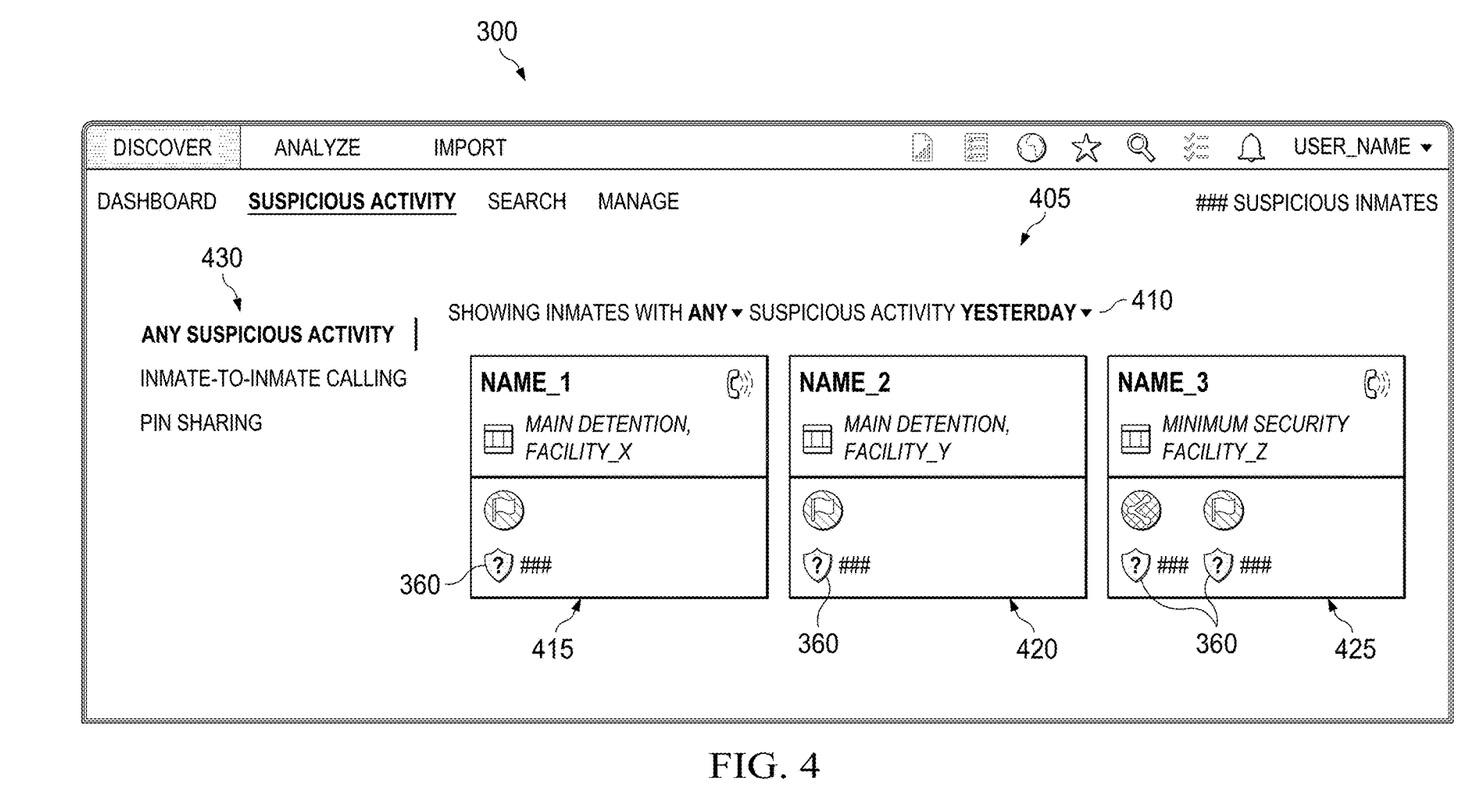
FIG. 4 is an illustration of an example centralized investigative data aggregation and analysis system web portal, showing an example suspicious inmate activity screen, according to some embodiments

With respect to suspicious activity, a user can use the link from the dashboard (e.g. by clicking on the suspicious activity pane banner) or choose suspicious activity menu item 365, which may be presented under discover section 370, or the like of the investigation portal. Once selected, the user is taken to a suspicious activity top level screen which will display suspicious activity, such as any suspicious activity for the previous day (by default). To wit, FIG. 4 shows example centralized investigative data aggregation and analysis system web portal 300 showing example suspicious inmate activity screen 405, according to some embodiments. Filters 410, such as may be displayed at a top of this screen, may afford the user different views. For example, the user may be allowed to filter results by category, date range, or the like. An inmate's number of suspicious activities may be noted in a tile (415, 420, 425), and may change based on the user-selected filters. The user may also be enabled to filter results by suspicious activity categories 430 (e.g. any suspicious activity, inmate-to-inmate calling, PIN sharing, etc.).

In accordance with some embodiments of the present systems and methods, details displayed in inmate tiles 415, 420, 425 in suspicious activity screen 405, and associated icons, may include one or more designation badges 360. For example, for an inmate that has one unconfirmed activity, and at least one each of illicit and non-illicit, if the user hovers over the designation icons, it will display the actual number under each. In such embodiments, the user may see the suspicious activity icons for an inmate in most, if not all, screens (except, by way of example) when searching). In search results, the user may see badges that show illicit or unknown suspicious activity, so as to alert the user to investigate that inmate further. For example, for an inmate that was found in a search that has at least one illicit and one unconfirmed suspicious activity, once the user selects the inmate, they will see the specific suspicious activities for that inmate. In accordance with embodiments of the present systems and methods, the user can also see suspicious activity (confirmed and unconfirmed) when browsing in communication records for an inmate. In the above example, if the inmate has two calls, one with unconfirmed suspicious activity and the other with confirmed illicit activity, the user can navigate to listen to the suspicious activities from this screen by opening the specific call.

Figure 5:
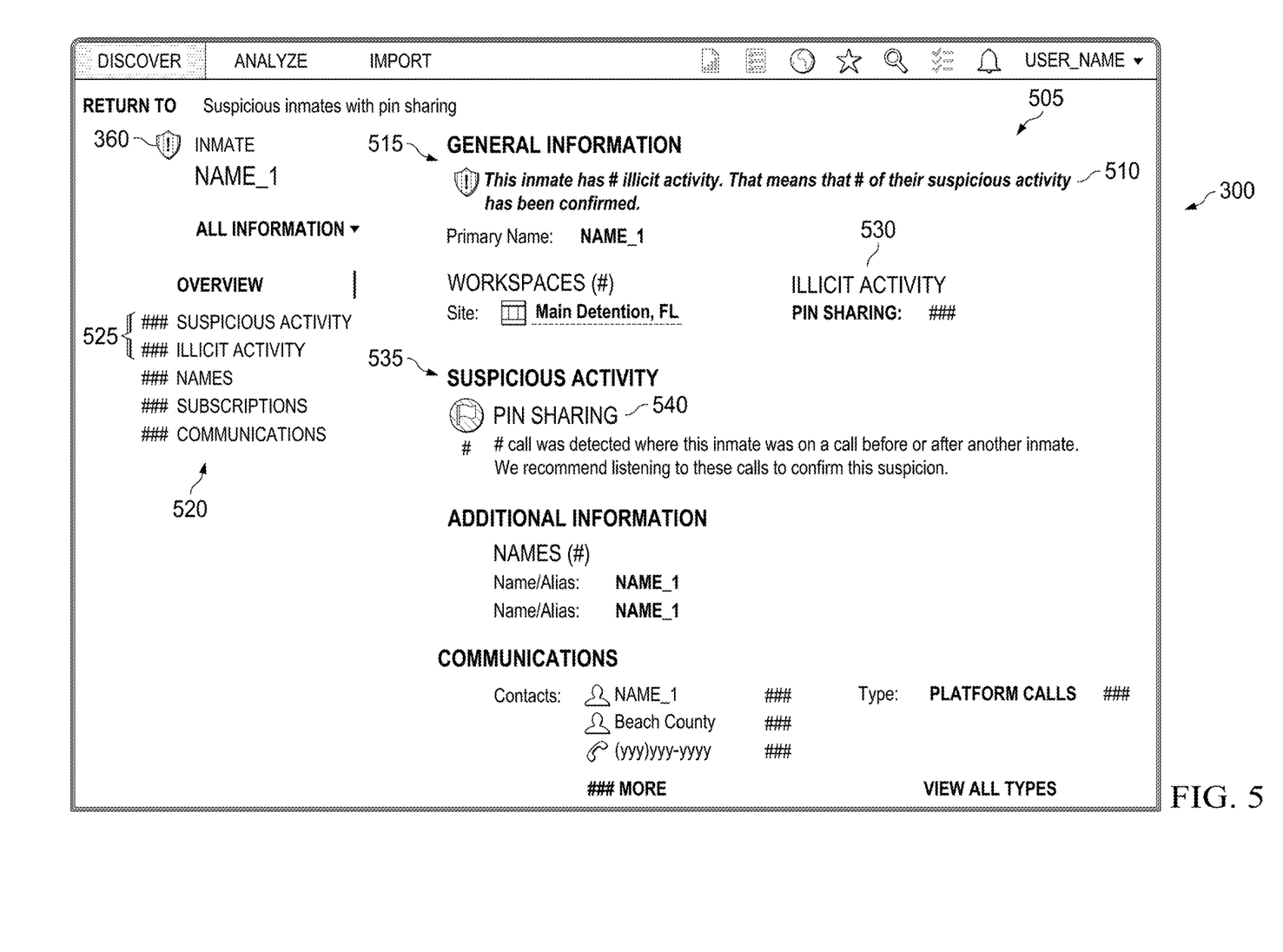
FIG. 5 is an illustration of an example centralized investigative data aggregation and analysis system web portal, showing an example inmate overview page, according to some embodiments.

FIG. 5 shows example centralized investigative data aggregation and analysis system web portal 300 showing example inmate overview page 505, according to some embodiments. Further, with respect to suspicious activity, inmate overview page 505 of investigation portal 300 may employ, as elsewhere, an attention-attracting badge (e.g. red-colored badge (360)) on the inmate overview page, if the inmate has confirmed illicit activity. Illicit activity is confirmed by an investigator in accordance with embodiments of the present systems and methods, such as by listening to an associated call. If there is no badge for an inmate, on such an inmate overview page, the inmate might still have suspicious activity, but nothing may (yet be) confirmed as illicit. In addition to the red badge, or the like, attention-attracting statement 510 (e.g. in red text) such as at a top of inmate overview page 505, such as under general information section 515, may indicate the number of confirmed illicit activities for the inmate. Further, the inmate overview may display overview categories 520, which may only appear when the inmate has suspicious activity (e.g. unconfirmed PIN sharing or inmate-to-inmate calling) or illicit activity (i.e. confirmed suspicious activity). By selecting resulting displayed suspicious activity menu link 525, the user may be taken to a top level of all the unconfirmed suspicious activity for that inmate, which may be filtered by the user. From this screen, the user can select review for the listed suspicious activity. On the other hand, selecting a displayed illicit activity link from the menu will take the user to a screen showing all confirmed illicit activities for the inmate, which can also be selected for review.

General information section 515 of inmate overview 505 will also indicate if there is confirmed illicit activity in such embodiments. By selecting illicit activity link 530, the user is taken to the same screen as the corresponding menu selection, discussed above. If the user selects either the resulting PIN sharing or inmate-to-inmate links, the user will be taken to the actual confirmed illicit calls in question. If the inmate has unconfirmed suspicious activity, this may show-up in overview 505, under suspicious activity heading 535. Clicking on the suspicious activity header takes the user to the same screen that the corresponding menu item does. Under suspicious activity section 535 of the overview, the user can select inmate-to-inmate, PIN sharing links, or the like (540). These links will take the user to the top level, filtered view for respective unconfirmed PIN sharing or inmate-to-inmate calling. On these screens, the unconfirmed calls can be opened for review (and confirmation as illicit activity).

As noted, PIN sharing is an example of suspicious activity that may be proactively reported in accordance with the present systems and methods. As discussed above, PIN sharing is discerned, revealed, or otherwise identified from data produced by investigative analytics based on voice biometric data. When selecting unconfirmed PIN sharing activities for review, a screen is displayed, wherein PIN sharing events may be grouped (similar grouping may be used when displaying inmate-to-inmate calling). To drill down to the actual call and recordings (if authorized), the user may open the suspicious activity by selecting a play button associated with the suspicious activity, or the like. If the user is not authorized to listen to phone calls, a play icon/button may not be presented. Information displayed with respect to a suspicious PIN sharing call may include an expected inmate column that shows the inmate that the call was supposed to be attached to. A suspected inmate column may show the inmate that is deemed as possibly on the call, such as based on voice biometric analytics. A "voice score," which is a percentage probability that the suspected inmate voice was heard on the call, may be displayed. These may be sorted highest to lowest. For example, if there are two inmates potentially heard on the call, one with a higher voice score may be displayed above the other. A contact column may show the person or phone number on the outside that was called. The contact may not be based on voice biometrics, but rather on either Billed Number Account (BNA) information or on the called phone number.

For a PIN sharing event that has already been confirmed (illicit or non-illicit) a displayed red dot, or the like, may indicate the suspected inmate was confirmed as illicit, and a displayed green dot, or the like, may indicate confirmation as non-illicit. Even if all inmates are not confirmed, if one inmate's activity is confirmed as illicit, this call may be designated as illicit.

As also noted, inmate-to-inmate calling is another example category of suspicious activity that may be proactively reported in accordance with the present systems and methods. As also discussed above, this type of suspicious activity may be discerned, revealed, or otherwise identified from analysis that detects impermissible conference calls, such as a pair of calls joined together. Investigative analytics may look for overlap in time in at least two calls to a same outside phone number from the same facility (i.e. a potential 3-way call) or the calls could be found across facilities. These types of suspicious calls may be designated as conference calls by the investigative analytics. As with PIN sharing, inmate-to-inmate calling events may be grouped on a reporting screen. When selecting an unconfirmed inmate-to-inmate call for review, a screen may be displayed, wherein a start time is shown, indicating when the inmate started the call with the contact. A duration, total amount of time the inmate was on the call, may be shown and an "overlap," which is an amount of time the two inmates were on the call with the same outside contact may also be shown. The user may be provided a play button for playing call recordings if they are authorized.

Confirming suspicious activity can be completed by opening a desired suspicious call for review, such as by opening up the call under either inmate by selecting a displayed play button beside the inmate/call. The user can listen to the call and determine if there was anything illicit about it. If the user wants to listen to the other inmate's version of the recording, they can open it also. A "start position" indicator may indicate where in the call the potential suspicious activity occurred. The user may press a displayed play button under this start position and it will take the user directly to that position in the call and start the playback. A duration may be shown for the amount of time that the suspicious activity occurred. Also, a "last update" may log the last investigator to make changes to the confirmation. When the user wants to confirm the potential inmate-to inmate call as illicit or non-illicit activity, the user may choose a respective "yes" or "no" button, such as under an "illicit" heading. Upon a change, an "update suspicious activity" dialog may appear. In this dialog, the user may be required to make a note to indicate why they determined the inmate activity as illicit or non-illicit. Therein, presets for common statements that might be used as defaults for the note may be made available. The user may also be afforded an opportunity to add a "follow-up task" from this dialog, in accordance with some embodiments. Once an inmate communication is deemed illicit or non-illicit, it can, in accordance with various embodiments of the present systems and methods, be changed based upon further review.

Embodiments of the present systems and methods may include "linkage analysis" reports that may include, in addition other information, suspicious activity and illicit activity as possible correlation points, such as may be displayed as graphic output.

Returning to FIG. 3, investigative widgets 315 shown on dashboard 305 may include tasks widget 330. Tasks may be used as a way to remind an investigator of any further actions to take in their investigation. Dashboard task widget 330 may display the task description and at least one related entity (inmate). In some cases, the user may be able to complete a task on the dashboard widget by checking a box associated with the task (375). Once completed, the task may disappear off of dashboard 305. The user can also select a task link on the dashboard to navigate to the user's open (and/or closed) tasks. Header bar 380 of dashboard 305 may include tasks icon 385 which allows the user to manage or create tasks. Clicking this task icon may create a new task, which auto-assigns an entity (inmate, organization, location, phone call) related to the context-sensitive screen being viewed. A relating entity may not be required to add a new task, but if an entity or entities are assigned to a task, the user may see that task under the corresponding inmate overview section (505). The task can also be completed or re-opened from the user's task screen. The user can input a description of the task and choose associated entities (if desired). Aforementioned top inmates widget 335 displays top inmates in the investigator's facility by call volume over the previous week, or so, so as to provide a frequency report for the facility/site. This widget may display change column 390 that shows the ranking from day to day and movement up or down of call frequency. As with other links, the user can click on the inmate and go to their main/overview page (505). Top contacts widget 340 works like top inmate widget 335, but displays the top individuals or phone numbers called by inmates, by call volume, over the past week, or so. However, the widget may be enabled to filter numbers using an exclusion list set up by the user. If a Billed Number Account (BNA) is known for the number, the name is shown, otherwise just the phone number may be shown, as illustrated. Recent records widget 345 displays the most recent inmates, organizations, locations, phone calls or phone numbers with which the investigator/user is working.

Figure 6:
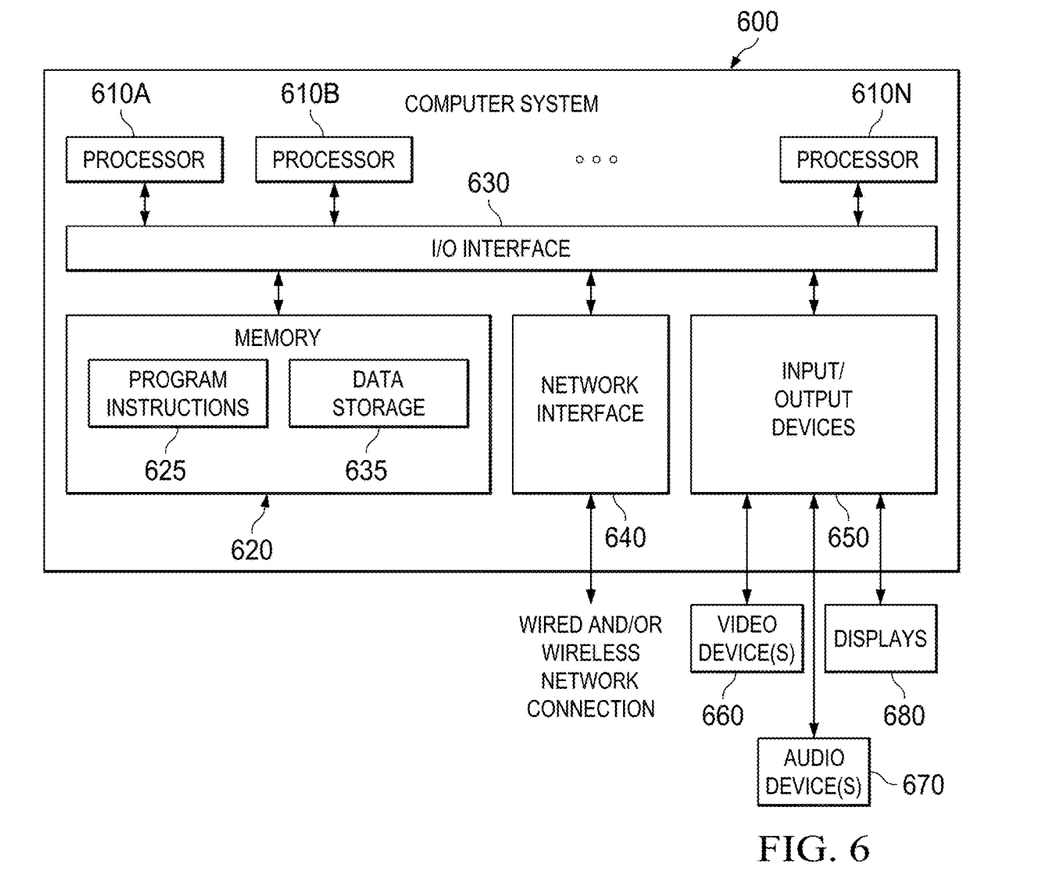
FIG. 6 is a block diagram of a computer system, device, station, or terminal configured to implement various techniques disclosed herein, according to some embodiments.

Embodiments of the present proactive investigation systems and methods for controlled-environment facilities, as described herein, may be implemented or executed, at least in part, by one or more computer systems. One such computer system is illustrated in FIG. 6. In various embodiments, computer system 600 may be a server, a mainframe computer system, a workstation, a network computer, a desktop computer, a laptop, a tablet computing device, media player, or the like. For example, in some cases, computer 600 may implement one or more steps of example process 200 described above with respect to FIGS. 1 through 5, and/or a computer system such as computer system 600 may be used as, or as part of, one or more of: controlled environment facility communications management systems 131 and/or 140; AMSs 112, 122 and 132; components of MASs 181, 182 and 183; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via a network. For example, in FIG. 1, centralized investigative data aggregation and analysis system 190 is illustrated as communicating with controlled-environment facility communications management systems 131 and 140, via public network 170, which may be the Internet. Further, users of the present investigative data aggregation and analysis system may communicate therewith via public network 170 (e.g. the Internet) or the like.

As illustrated, example computer system 600 includes one or more processors 610 coupled to a system memory 620 via an input/output (I/O) interface 630. Example computer system 600 further includes a network interface 640 coupled to I/O interface 630, and one or more input/output devices 650, such as video device(s) 660 (e.g., a camera), audio device(s) 670 (e.g., a microphone and/or a speaker), and display(s) 680. Computer system 600 may also include a cursor control device (e.g., a mouse or touchpad), a keyboard, etc. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In various embodiments, computer system 600 may be a single-processor system including one processor 610, or a multi-processor system including two or more processors 610 (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, POWERPC®, ARIVI®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 5, above, may be stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-readable medium may include any tangible or non-transitory storage media or memory media such as magnetic or optical media-e.g., disk or CD/DVD-ROM coupled to computer system 600 via I/O interface 630, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any suitable protocol, timing or other data transformations to convert data signals from one component (e.g., system memory 620) into a format usable by another component (e.g., processor 610).

In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments, some or all of the functionality of I/O interface 630, such as an interface to system memory 620, may be incorporated into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 6, memory 620 may include program instructions 625, configured to implement certain embodiments described herein, and data storage 635, comprising various data accessible by program instructions 625. In an embodiment, program instructions 625 may include software elements corresponding to one or more of the various embodiments illustrated in the above figures. For example, program instructions 625 may be implemented in various embodiments using any desired programming language, scripting language, or combination of programming languages and/or scripting languages (e.g., C, C++, C#, JAVA®, JAVASCRIPT®, PERL®, etc.). Data storage 635 may include data that may be used in these embodiments. In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A proactive multiple controlled-environment facility investigative data aggregation and analysis system comprising:
   at least one controlled-environment facility communications management system, each controlled-environment facility communications management system associated with at least one controlled-environment facility and, configured to:
      capture data related to communications associated with each of a plurality of residents of each controlled-environment facility; and
      provide financial data related to controlled-environment facility resident accounts; and
   a centralized investigative data aggregation and analysis system configured to:
      receive, from each controlled-environment facility communications management system, captured data related to communications associated with each of the plurality of residents and/or financial data related to controlled-environment facility resident accounts;
      identify suspicious activity, based at least in part on at least one of voice biometric analysis of captured data, communication analysis of the captured data, location of calls indicated by the captured data, and the financial data;
      identify the controlled-environment facility resident associated with resultant identified suspicious activity;—
      rank or rate identified suspicious activities based on frequency and number of suspicious activities for a given identified resident; and
      display at least a number of the identified suspicious activities, according to the rank or rate.

2. The system of claim 1, wherein the centralized investigative data aggregation and analysis system is further configured to provide a web-based portal that at least displays the number of identified suspicious activities according to the rank or rate.

3. The system of claim 1, further comprising at least one managed access system, each associated with a respective controlled-environment facility, and wherein the centralized investigative data aggregation and analysis system is further configured to receive, from each managed access system, or from each managed access system though a respective controlled-environment facility communications management system, captured data related to wireless communications intercepted by the respective managed access system.

4. The system of claim 1, wherein the centralized investigative data aggregation and analysis system is further configured to display names of at least a number of residents or other individuals associated with identified suspicious activities, according to the rank or rate.

5. The system of claim 4, wherein the centralized investigative data aggregation and analysis system is further configured to display the identified suspicious activities and the names of residents or other individuals associated with identified suspicious activities, according to the rank or rate, from a predetermined time period.

6. The system of claim 4, wherein the centralized investigative data aggregation and analysis system is further configured to link further details about each identified suspicious activity and/or each resident or other individual associated with an identified suspicious activity to display of each identified suspicious activity and/or each name of a resident or other individual associated with an identified suspicious activity, such that selection of the displayed activity or name displays the further details.

7. The system of claim 4, wherein the centralized investigative data aggregation and analysis system is further configured to display a badge with each identified suspicious activity and/or each name of a resident or other individual associated with an identified suspicious activity, the badge indicating whether the identified suspicious activity is unconfirmed, illicit or non-illicit.

8. The system of claim 7, wherein the centralized investigative data aggregation and analysis system is further configured to enable a user to change the indication of the identified suspicious activity as unconfirmed, illicit or non-illicit.

9. The system of claim 1, wherein at least one of the identified suspicious activities is personal identification number sharing.

10. The system of claim 9, wherein the centralized investigative data aggregation and analysis system is further configured to identify personal identification number sharing, based, at least in part, on the voice biometric analysis of the captured data.

11. The system of claim 9, wherein the centralized investigative data aggregation and analysis system is further configured to display a voice score, based at least in part on a voice biometric analysis derived percentage probability that a named resident's or other individual's voice was recognized by the centralized investigative data aggregation and analysis system in a call associated with a personal identification number other than a personal identification number of the named resident or other individual.

12. The system of claim 11, wherein the rank or rate is based, at least in part, upon the voice score.

13. The system of claim 1, wherein at least one of the identified suspicious activities is resident-to-resident calling.

14. The system of claim 13, wherein the centralized investigative data aggregation and analysis system is further configured to identify resident-to-resident calling from analysis that detects impermissible conference calls between residents.

15. The system of claim 14, wherein the analysis that detects impermissible conference calls between residents comprises detection of overlap in time in at least two calls to a same outside phone number from the same controlled-environment facility or different controlled-environment facilities.

16. The system of claim 15, wherein the centralized investigative data aggregation and analysis system is further configured to employ an exclusion list of outside phone numbers to which resident-to-resident calling is permitted so as to disregard a resident-to-resident call to an excluded outside number as suspicious activity.

17. A proactive multiple controlled-environment facility investigative data aggregation and analysis system implemented method comprising:
   receiving, from at least one controlled-environment facility communications management system, by a centralized investigative data aggregation and analysis system, captured data related to communications associated with each of the plurality of residents and/or financial data related to controlled-environment facility resident accounts, and/or from at least one controlled-environment facility managed access system captured data related to wireless communications intercepted by a respective managed access system;

identifying, by the centralized investigative data aggregation and analysis system, suspicious activity, based at least in part on at least one of voice biometric analysis of captured data, communication analysis of the captured data, location of calls indicated by the captured data, and the financial data;

identifying the controlled-environment facility resident associated with resultant identified suspicious activity;— ranking or rating, by the centralized investigative data aggregation and analysis system, identified suspicious activities based on frequency and number of suspicious activities for a given resident;

linking, by the centralized investigative data aggregation and analysis system, details about each identified suspicious activity and/or each resident or other individual associated with an identified suspicious activity; and displaying, by the centralized investigative data aggregation and analysis system, at least a number of the identified suspicious activities and/or names of at least a number of residents or other individuals associated with identified suspicious activities, according to the ranking or rating, on a centralized investigative data aggregation and analysis system portal, from a predetermined or user-selected time period, such that selection of the displayed activity or name displays the details.

18. The method of claim 17, wherein displaying the number of identified suspicious activities and/or names of at least the number of residents or other individuals associated with identified suspicious activities further comprises providing, by the centralized investigative data aggregation and analysis system, a web-based portal that at least displays the number of identified suspicious activities and/or names of at least the number of residents or other individuals associated with identified suspicious activities.

19. The method of claim 17, further comprising displaying, on the centralized investigative data aggregation and analysis system portal, a user-modifiable badge with each identified suspicious activity and/or each name of a resident or other individual associated with an identified suspicious activity, the badge indicating whether the identified suspicious activity is unconfirmed, illicit or non-illicit, modifiable by a user.

20. The method of claim 17, wherein at least one of the identified suspicious activities is personal identification number sharing.

21. The method of claim 20, wherein identifying suspicious activity further comprises identifying, by the centralized investigative data aggregation and analysis system, personal identification number sharing, based, at least in part, on the voice biometric analysis of the captured data.

22. The method of claim 20, further comprising displaying, by the centralized investigative data aggregation and analysis system, a voice score, based at least in part on a voice biometric analysis derived percentage probability that a named resident's or other individual's voice was recognized by the centralized investigative data aggregation and analysis system in a call associated with a personal identification number other than a personal identification number of the named resident or other individual.

23. The method of claim 22, wherein the ranking or rating is based, at least in part, upon the voice score.

24. The method of claim 17, wherein at least one of the identified suspicious activities is resident-to-resident calling.

25. The method of claim 24, further comprising identifying, by the centralized investigative data aggregation and analysis system, resident-to-resident calling from analysis that detects impermissible conference calls between residents.

26. The method of claim 25, further comprising detecting, by the analysis that detects impermissible conference calls between residents, overlap in time in at least two calls to a same outside phone number from the same controlled-environment facility or different controlled-environment facilities.

27. The method of claim 26, further comprising employing, by the centralized investigative data aggregation and analysis system, an exclusion list of outside phone numbers to which resident-to-resident calling is permitted so as to disregard a resident-to-resident call to an excluded outside number as suspicious activity.

28. A tangible non-transitory computer-readable storage medium having program instructions stored thereon that, upon execution by a multiple controlled-environment facility investigative data aggregation and analysis system, cause the system to:

receive or retrieve, from at least one controlled-environment facility communications management system, captured data related to communications associated with each of a plurality of controlled-environment facility residents and/or financial data related to controlled-environment facility resident accounts, and/or from at least one controlled-environment facility managed access system, captured data related to wireless communications intercepted by a respective managed access system;

identify suspicious activity, based at least in part on at least one of voice biometric analysis of captured data, communication analysis of the captured data, location of calls indicated by the captured data, and the financial data;

identify the controlled-environment facility resident associated with resultant identified suspicious activity;

rank or rate identified suspicious activities based on frequency and number of suspicious activities for a given resident;

link details about each identified suspicious activity and/or each resident or other individual associated with an identified suspicious activity; and display at least a number of the identified suspicious activities and/or names of at least a number of residents or other individuals associated with identified suspicious activities, according to the rank or rate, from a predetermined or user-selectable time period, such that selection of the displayed activity or name displays the details.

* * * * *